(12) United States Patent
Daga et al.

(10) Patent No.: US 11,212,249 B2
(45) Date of Patent: Dec. 28, 2021

(54) REAL TIME TRANSCRIPTION AND FEED OF VOICE MESSAGES BASED ON USER PRESENCE AND PREFERENCE

(71) Applicant: Avaya Management L.P., Santa Clara, CA (US)

(72) Inventors: Navin Daga, Silapathar (IN); Pushkar Yashavant Deole, Pune (IN); Sandesh Chopdekar, Pune (IN)

(73) Assignee: AVAYA Management L.P., Santa Clara, CA (US)

( * ) Notice: Subject to any disclaimer, the term of this patent is extended or adjusted under 35 U.S.C. 154(b) by 0 days.

(21) Appl. No.: 16/832,086

(22) Filed: Mar. 27, 2020

(65) Prior Publication Data
US 2021/0306294 A1   Sep. 30, 2021

(51) Int. Cl.
| | | |
|---|---|---|
| H04L 12/58 | (2006.01) | |
| H04M 3/533 | (2006.01) | |
| G10L 15/22 | (2006.01) | |
| G10L 15/26 | (2006.01) | |

(52) U.S. Cl.
CPC .............. *H04L 51/36* (2013.01); *G10L 15/22* (2013.01); *G10L 15/26* (2013.01); *H04L 51/043* (2013.01); *H04M 3/53308* (2013.01); *H04M 2203/4563* (2013.01)

(58) Field of Classification Search
USPC .......... 379/88.11, 88.12, 88.14, 88.19, 88.21
See application file for complete search history.

(56) References Cited

U.S. PATENT DOCUMENTS

| | | | |
|---|---|---|---|
| 6,507,643 B1 | 1/2003 | Groner | |
| 8,971,312 B2* | 3/2015 | Moore | H04L 51/28 370/352 |
| 9,137,374 B2* | 9/2015 | Zhou | H04M 3/533 |
| 9,787,625 B2* | 10/2017 | Tardelli | H04L 67/1095 |
| 10,154,145 B1* | 12/2018 | Kashimba | G10L 15/26 |
| 10,922,483 B1* | 2/2021 | Shevchenko | G06F 40/20 |
| 2005/0201534 A1* | 9/2005 | Ignatin | H04M 3/436 379/88.22 |
| 2008/0039966 A1* | 2/2008 | Redgewell | H04L 65/4084 700/94 |
| 2013/0063543 A1* | 3/2013 | Bentley | H04L 65/1096 348/14.03 |

(Continued)

OTHER PUBLICATIONS

Navin Daga et al.; "Real-Time Transcription and Feed of Voice Messages Based on User Presence and Preference"; U.S. Appl. No. 17/454,123, filed Nov. 9, 2021.

*Primary Examiner* — Binh Kien Tieu
(74) *Attorney, Agent, or Firm* — Stevens & Showalter LLP

(57) ABSTRACT

Delivering a transcribed voice message includes detecting receipt of a voice message for delivery to a user, the voice message related to an incoming call for the user; determining a current presence of the user on at least one of a plurality of messaging channels in real time during receipt of the voice message; transcribing the voice message to text in real time; and delivering, in real time, the transcribed voice message to the at least one messaging channel on which the current presence of the user is determined. Delivering the transcribed voice message can also include receiving from the user initial identification of different user accounts, along with authorizations and permissions.

16 Claims, 4 Drawing Sheets

(56) References Cited

U.S. PATENT DOCUMENTS

| | | | |
|---|---|---|---|
| 2015/0055765 A1* | 2/2015 | Jackson | H04M 3/5307 |
| | | | 379/88.14 |
| 2015/0103983 A1* | 4/2015 | Kilmer | H04M 3/4365 |
| | | | 379/88.01 |
| 2016/0072951 A1* | 3/2016 | Zhou | H04M 3/533 |
| | | | 455/413 |
| 2016/0112570 A1* | 4/2016 | Shaw | H04W 4/16 |
| | | | 455/412.2 |
| 2017/0187882 A1* | 6/2017 | Woolsey | G10L 15/26 |
| 2018/0192364 A1* | 7/2018 | Campos | H04W 48/18 |
| 2018/0227424 A1* | 8/2018 | Dorsey | H04M 1/72552 |
| 2019/0035400 A1* | 1/2019 | Bonforte | H04L 67/306 |
| 2020/0068069 A1* | 2/2020 | Mumick | H04M 3/42195 |

* cited by examiner

REAL TIME TRANSCRIPTION AND FEED OF VOICE MESSAGES BASED ON USER PRESENCE AND PREFERENCE

BACKGROUND

The present disclosure relates generally to audio transcription of contact center interactions and/or unified communications, and, more particularly, to a messaging channel presence delivery of the transcription.

Traditional contact centers focus on agents interacting with customers by listening to what the customer says. There are also call recording solutions, such as those available from Verint that provide files of the audio that can be processed for off-line transcription. Recently some systems have started to do near-real-time transcription, such as the Avaya Conversational Intelligence (ACI) program. ACI utilizes events related to a call, such as when multiple parties have answered, to determine what portions of the call should be transcribed.

BRIEF SUMMARY

One aspect of the present invention relates to a method for delivering a transcribed voice message that includes detecting, by a computer, receipt of a voice message for delivery to a user, the voice message related to an incoming call for the user; determining, by the computer, a current presence of the user on at least one of a plurality of messaging channels during receipt of the voice message; transcribing, by the computer, the voice message to text; and delivering, by the computer, the transcribed voice message to the at least one messaging channel on which the current presence of the user is determined. Furthermore, the method can include continuously monitoring, by the computer, the plurality of messaging channels to determine whether the user is present on each channel. More particularly, the method can include continuously monitoring, by the computer, a subset of the plurality of messaging channels to determine whether the user is present on each channel, wherein the subset is selected based on the indication of messaging channel preference received from the user.

In accordance with this aspect, the method can include receiving, by the computer, an indication of messaging channel preference from the user, wherein the indication of messaging channel preference includes one or more messaging channels associated with different time periods. Furthermore, the different time periods can include at least one different time period within a single day, or different days within a week, or different weeks within a month.

Additionally, in accordance with this aspect, the method can include transcribing the voice message to occur in real-time as the voice message is being received. Also, the transcribed voice message can be delivered in real-time to the at least one messaging channel as the voice message is being received.

The present invention can also include analyzing, by the computer, the indication of messaging channel preference from the user; determining, by the computer, a ranked list of at least a portion of the plurality of messaging channels based on the indication of messaging channel preference; and selecting, by the computer, the at least one messaging channel to deliver the transcribed voice message from the ranked list.

In accordance with this aspect of the invention, the method can include receiving, by the computer, an instruction from the user to connect with the incoming call while the voice message is being transcribed; and connecting, by the computer, the user with the incoming call while the voice message is being transcribed.

Also, the method can include determining, by the computer, an originator of the incoming call; and delivering, by the computer, the transcribed voice message to the at least one messaging channel based at least in part on the originator of the incoming call.

Another aspect of the present invention relates to a system for delivering a transcribed voice message that includes a memory device, storing executable instructions; and a processor in communication with the memory device. The processor when executing the executable instructions detects receipt of a voice message for delivery to a user, the voice message related to an incoming call for the user; determines a current presence of the user on at least one of a plurality of messaging channels during receipt of the voice message; transcribes the voice message to text; and delivers the transcribed voice message to the at least one messaging channel on which the current presence of the user is determined. Furthermore, the system can include continuously monitoring the plurality of messaging channels to determine whether the user is present on each channel. More particularly, the system can include continuously monitoring a subset of the plurality of messaging channels to determine whether the user is present on each channel, wherein the subset is selected based on the indication of messaging channel preference received from the user.

In accordance with this aspect, the system can include receiving an indication of a messaging channel preference from the user, wherein the indication of messaging channel preference includes one or more messaging channels associated with different time periods. Furthermore, the different time periods can include at least one different time period within a single day, or different days within a week, or different weeks within a month.

Additionally, in accordance with this aspect, the system can include transcribing the voice message to occur in real-time as the voice message is being received. Also, the transcribed voice message can be delivered in real-time to the at least one messaging channel as the voice message is being received.

The present invention can also include analyzing the indication of messaging channel preference from the user; determining a ranked list of at least a portion of the plurality of messaging channels based on the indication of messaging channel preference; and selecting the at least one messaging channel to deliver the transcribed voice message from the ranked list.

In accordance with this aspect of the invention, the system can include receiving an instruction from the user to connect with the incoming call while the voice message is being transcribed; and connecting the user with the incoming call while the voice message is being transcribed.

Also, the system can include determining an originator of the incoming call; and delivering the transcribed voice message to the at least one messaging channel based at least in part on the originator of the incoming call.

BRIEF DESCRIPTION OF THE DRAWINGS

So the manner in which the above recited features of the present disclosure may be understood in detail, a more particular description of embodiments of the present disclosure, briefly summarized above, may be had by reference to embodiments, which are illustrated in the appended drawings. It is to be noted, however, the appended drawings illustrate only typical embodiments encompassed within the scope of the present disclosure, and, therefore, are not to be considered limiting, for the present disclosure may admit to other equally effective embodiments, wherein.

DETAILED DESCRIPTION

Figure 1:
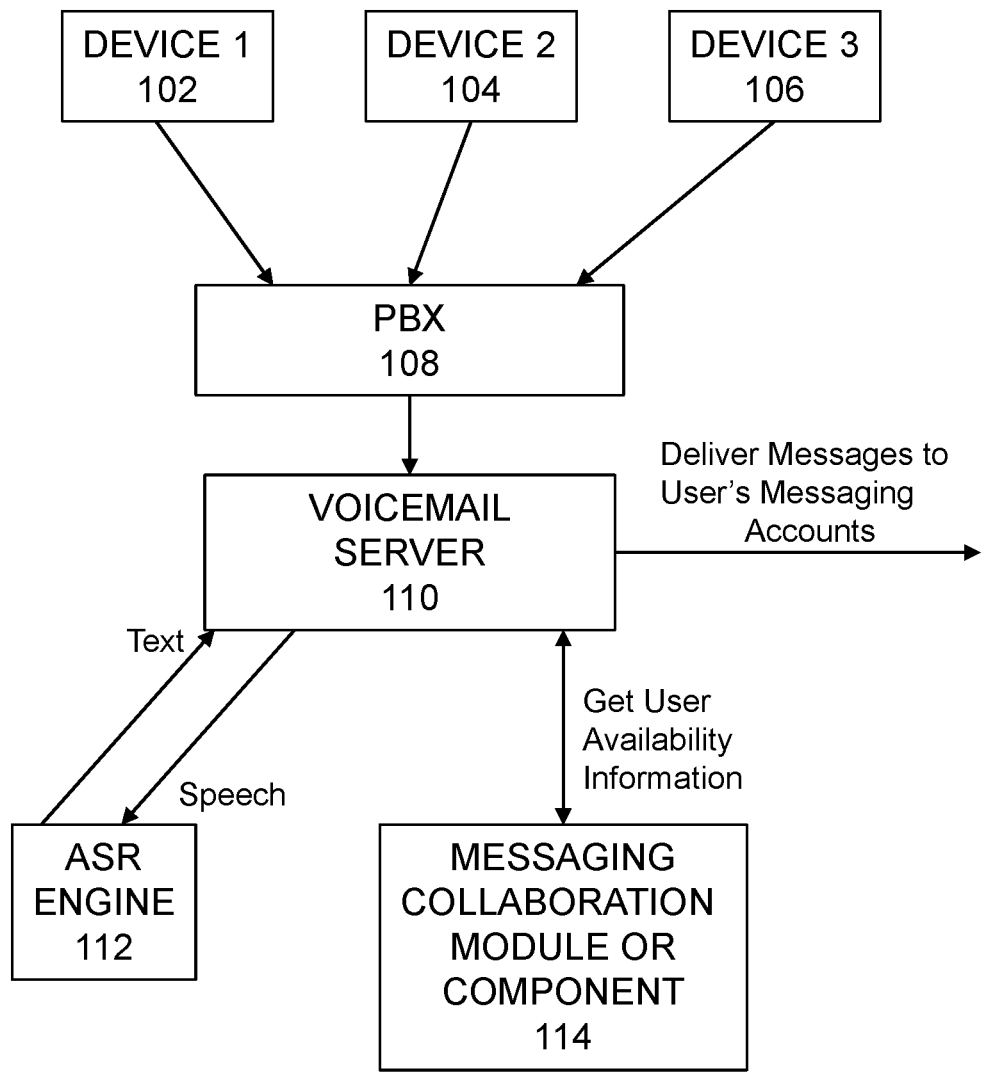
FIG. 1 and FIG. 2 illustrate a transcription service architecture in accordance with the principles of the present disclosure.

The present disclosure will be illustrated below in conjunction with an exemplary communications system. Although well suited for use with, e.g., a system having an Automated Call or Contact Distribution (ACD) system or other similar contact processing switch, the present disclosure is not limited to any particular type of communications system switch or configuration of system elements. Those skilled in the art will recognize that the disclosed techniques may be used in any communications application in which it is desirable to provide improved contact processing. Furthermore, embodiments of the present invention do not rely on being implemented with respect to an ACD system but can be used to augment any voicemail system or voicemail server.

In the following detailed description, numerous specific details are set forth in order to provide a thorough understanding of embodiments or other examples described herein. In some instances, well-known methods, procedures, components and circuits have not been described in detail, so as to not obscure the following description. Further, the examples disclosed are for illustrative purposes only and should not be construed as limiting of the scope of embodiments of the present disclosure.

The term "a" or "an" entity refers to one or more of that entity. As such, the terms "a" (or "an"), "one or more," and "at least one" may be used interchangeably herein. It is also to be noted that the terms "comprising," "including," and "having" may be used interchangeably.

The term "automatic" and variations thereof, as used herein, refers to any process or operation done without material human input when the process or operation is performed. However, a process or operation may be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material."

The term "computer-readable medium" as used herein refers to any tangible storage and/or transmission medium that participates in storing and/or providing instructions to a processor for execution. Such a medium may take many forms, including but not limited to, non-volatile media, volatile media, and transmission media. Non-volatile media includes, for example, NVRAM, or magnetic or optical disks. Volatile media includes dynamic memory, such as main memory. Common forms of computer-readable media include, for example, a floppy disk, a flexible disk, hard disk, magnetic tape, or any other magnetic medium, magneto-optical medium, a CD-ROM, any other optical medium, punch cards, paper tape, any other physical medium with patterns of holes, RAM, PROM, EPROM, FLASH-EPROM, solid state medium like a memory card, any other memory chip or cartridge, a carrier wave as described hereinafter, or any other medium from which a computer may read. A digital file attachment to email or other self-contained information archive or set of archives is considered a distribution medium equivalent to a tangible storage medium. When the computer-readable media is configured as a database, it is to be understood that the database may be any type of database, such as relational, hierarchical, object-oriented, and/or the like. Accordingly, the disclosure is considered to include a tangible storage medium or distribution medium and prior art-recognized equivalents and successor media, in which the software implementations of the present disclosure are stored.

The terms "determine," "calculate," and "compute," and variations thereof, as used herein, are used interchangeably and include any type of methodology, process, mathematical operation or technique.

The term "module" as used herein refers to any known or later developed hardware, software, firmware, artificial intelligence, fuzzy logic, or combination of hardware and software that is capable of performing the functionality associated with that element. Also, while the present disclosure is described in terms of exemplary embodiments, it should be appreciated that those individual aspects of the present disclosure may be separately claimed.

The terms "switch," "server," "contact center server," or "contact center computer server" as used herein should be understood to include a Private Branch Exchange (PBX), an ACD system, an enterprise switch, or other type of telecommunications system switch or server, as well as other types of processor-based communications control devices such as, but not limited to, media servers, computers, adjuncts, and the like. One or more embodiments of the present disclosure may utilize Session Initiation Protocol (SIP) as a communications protocol. SIP is a communications protocol that is known and described in Internet Engineering Task Force (IETF) Request For Comment (RFC) 3261, the content of which is hereby incorporated by reference in its entirety. SIP is an open signaling protocol for establishing many kinds of real-time communications sessions, such as voice, video, and/or instant messaging, and may be used with other IETF protocols to build multimedia architectures including Real-Time Transport Protocol (RTP), Real-Time Streaming Protocol (RTSP), Media Gateway Control Protocol (MEGACO), and the Session Description Protocol (SDP).

The invention in accordance with the principles of the present disclosure relates to a transcription service that efficiently uses call events to be reliably delivered to a called party.

In the on-premises system, a customer call in, say to a contact center that is staffed by agents, although this could also be an Interactive Voice Response (IVR) system or any other communication with human or synthesized voice. As the call proceeds, events are generated such as call answered, participant entered, participant left, call transferred, call placed on/off hold, etc. The call events can be sent to a transcription service for processing. Separate from a contact center interaction, a calling party may call another party during day-to-day interactions.

Often a user, or call receiver, can receive a call right in the middle of a meeting or other activity in which the user cannot pick up the call. As a result, the caller typically, leaves a voice message. However, because of the ongoing activity, the call receiver may not be able to listen to the voice message either. By the time the call receiver gets out of the meeting or finishes the other activity, they may either forget about the call/voice message or the message that the caller left becomes irrelevant by that time.

Some current ways to address this problem is transcribing the voice message to text message and sending the transcribed message as SMS or email, as configured in the user preferences. However, this neither guarantees nor does this increase the probability that the transcribed message is received by the called person in time and/or before the message becomes irrelevant for the called person.

The advent in technology, such as social channels and rich communication services (RCS), goes beyond the traditional messaging and provides capabilities that were not possible before. These technologies can be used in a way that the transcribed voicemail is delivered to the called person immediately. Rich Communication Services (RCS) is a communication protocol between mobile telephone carriers and between phone and carrier that can augment or replace short message service (SMS) messages with a text-message system and can transmit in-call multimedia. In the description below, the phrase "messaging channel" refers to a variety of available channels such as RCS channels as well as social media channels. These channels typically have a software development kit (SDK) or application programming interface (API) that allow software developers to create executable programs that interface with the channels. These executable programs, when executed, can determine information about users and user activity, even in real-time, on each of the channels as well as deliver messages, of various formats, to users of the channels.

It is possible, currently, for messages to be delivered to a called party based on a preference setting on how that called party desires messages to be delivered. Thus, a text message can be sent to one or more messaging channels as configured by a user in the preferences, however this approach does not guarantee whether the message will be received by the user or even increase the probability that the message will be received.

Embodiments in accordance with the present invention enhances the traditional messaging systems in order to find the presence of a user in real time on any of the messaging channels configured in the user preference settings and delivers the message on a channel that would guarantee or at least increase the probability of the message getting received by the user immediately.

In particular, embodiments herein contemplate the following: a) get the messaging channel preferences of the user; b) get the presence details and time profile configuration of the user for preferred channels and sort the channels as per the presence of the user, c) transcribe voice message into a text, or other format, message in real time, and d) deliver the transcribed text message in real time to the user as the caller is leaving the voice message.

For example, if the called party is in a meeting, then an instant message, or text message, can be sent to that called party in real time as the caller is leaving the voice message. However, if the call is being received out of office hours, then the present system can feed a transcribed-to-text message live to some social media account, messaging channel, or another instant messenger where the user could be available.

Accordingly, the embodiments of the present invention include a "Messaging Collaboration" component or module implemented on one or more computers. The "Messaging Collaboration" component continuously gathers data about a particular user's social presence on different messaging channels such as social channels or RCS channels as configured by the user in preferences and feeds this data back into a voice mail system. A user can set preferences in the Messaging Collaboration component to indicate days and times that the user is likely present on different messaging media accounts. Accordingly, the Messaging Collaboration component can search, or detect, for the presence of the user if an incoming call or voice mail is received by the voice messaging system and a transcribed text message can be intelligently delivered.

As an initial matter, real time transcription can occur when a voicemail related to a call is received such that real time transcription of the voice message is generated and sent to the messaging channel the user is available at, as determined by preferences the user set in the Messaging Collaboration component.

This capability can also be applied to the call screening feature. Presently, in typical call screening features, a called person (user) can listen to the voice message and can still pick up the call and talk to the caller when the called party believes the call is urgent or is at a place that they can answer the call. In embodiments of the present invention, such a call screening feature can be extended with a real time transcribed text message, wherein the transcribed text message is delivered to the user on a messaging channel, after reading in which the user can still attend the call.

The user can either pick up the call through some integrated portal which has both call control as well as chat facilities or the message can be delivered through any instant message service, social media, RCS channel, etc. and the user can pick up the call through any soft client running on the same device.

Before a transcribed text message is delivered via a messaging channel, the voice message can be transcribed using speech to text. Based on the user presence and preference, the user can get the transcribed voice message. The user can configure his preference for different channels and based on the user availability on any of these channels, the transcribed message can be delivered. As noted, the user can set, or select, different preferences of which messaging channels they will likely be using at different times of the day or different times of the week. The preferences can also include temporary settings such as if the user is out at a conference or on vacation and is not at their typical locations or have access to their typical devices.

A user, thus, can typically use multiple messaging channels to effectively communicate and deliver a transcribed message to the user, the present invention contemplates identifying a preferred, or a ranked list of preferred channels of the customer. Accordingly, the described Messaging Collaboration component or module will try to identify which is the most effective channel to communicate with a user at a particular time based on the stored preferences previously configured by the user.

Also, the Messaging Collaboration component will gather information about the channels used by a customer, and take authorization to be able to query the customer presence on these channels. As mentioned above, social media channels, messaging channels, and RCS channels typically have an Application Programming Interface (API) or a Software Development Kit (SDK) that allows autonomous (or programmatic) processes like the Messaging Collaboration component or module to query the channel to determine whether or not a user is present on the channel or to determine recent activity of a user on the channel. The user can provide requisite permissions or credentials to the Messaging Collaboration component to allow it to access the social media channels and other messaging channels to determine the user's presence.

In addition, the Messaging Collaboration component can continuously, or at least periodically, monitor the different messaging channels to augment information about the user's presence and likely future presence on a particular messaging channel. Thus, the Messaging Collaboration component can determine how actively the user uses the respective channel. Depending on the authorizations provided by the user, monitored parameters could include how many times the user is active on a given messaging channel in a given timeframe, how many posts are done by the user, how many likes are done by the user, delay in reading a message (time difference between when a message is received and when it is read), how many messages are read, etc.

As a result, based on the output obtained from the API (user activity), the Messaging Collaboration component can maintain a chart, or similar data structure, that is sorted to be indicative of the most actively used to least actively used channel by the user. So, essentially, the chart would contain multiple channels arranged from most actively used to least actively used by that user. For example, the chart may indicate a user is currently active on Facebook and LINE but not active on Twitter, so the sequence for delivering messages for that user would be Facebook, LINE, and Twitter. As a way to be more specific, the Messaging Collaboration component could perform further analysis as authorized by the user to determine the sequence between Facebook and LINE. The analysis, for example, could determine that LINE was used more frequently than Facebook in the last 48 hours or so, and then the final sequence for delivering a transcribed text message would be LINE, Facebook, and Twitter. In accordance with embodiments of the present invention, the Messaging Collaboration component continuously keeps checking the status of the user using the APIs and keeps feeding that back into the Voicemail delivery system.

As a further enhancement, and preferences set by the user, the messages to be delivered in real time could be filtered based on the user preferences like the type of message and where is the user available at that time. For example, a user can configure that if the user is at his or her workplace, only messages from known contacts are to be delivered. Voice messages from other contacts will still be received, but transcribed text messages will not be delivered using one of the configured messaging channels Accordingly, embodiments of the present invention provide the improvement over current technologies of delivering transcribed voice messages to a multitude of media channels (provided through social network integration and/or via RCS) in a sequence of most preferred to least preferred, as determined by the voice mail system through user's presence/activity on a channel in real time, in order to increase the probability of the message being received by the user immediately, providing the best possible user experience.

The system illustrated in FIGS. 1-3 can be implemented within the context of one or more data processing systems described later with respect to FIG. 4. The voicemail server 110, the PBX 108, the ASR engine 112, and the Messaging Collaboration component (or module) 114 can be implemented on one or more data processing systems described later with respect to FIG. 4.

Different callers can use respective devices 102, 104, 106 to call into a contact center or PBX 108 over any of the various known communication networks. The PBX 108 is in communication with a voicemail server 110. The voicemail server 110, as known in the art, receives voice messages for a called party that is unable to, or chosen not to, answer an incoming call. The voicemail server includes different storage partitions that saves voicemail messages for different users associated with the PBX 108. While illustrated as two separate components in FIG. 1, the PBX 108 and Voicemail Server may, in other embodiments, be implemented on a single computer platform.

The system of FIG. 1 also includes an automated speech recognition system (ASR) 112 that is capable of transcribing the received voice messages to text. In particular, as described above, the ASR engine 112 may perform the transcription in real-time, or near real time, as a voice message is being received via the PBX 108 and the voicemail server 110.

The voicemail server 110 is also in communication with the Messaging Collaboration component 114 described above. The Messaging Collaboration component 114 provides information to the voicemail server 110 regarding potential ways to deliver a transcribed voice message to a user. The voicemail server 110 via a plugin or component integrated with the voicemail server will include the capability (based on user preferences and settings) to communicate with different messaging channels for a user. In particular, the integrated component or plugin of the voicemail server 110 can send a text, or a transcribed voice message to one or more messaging channels on which the user is likely currently present. The voicemail server 110 can send the text message to multiple messaging channels in a particular order or select a single messaging channel for sending the text message.

Figure 2:
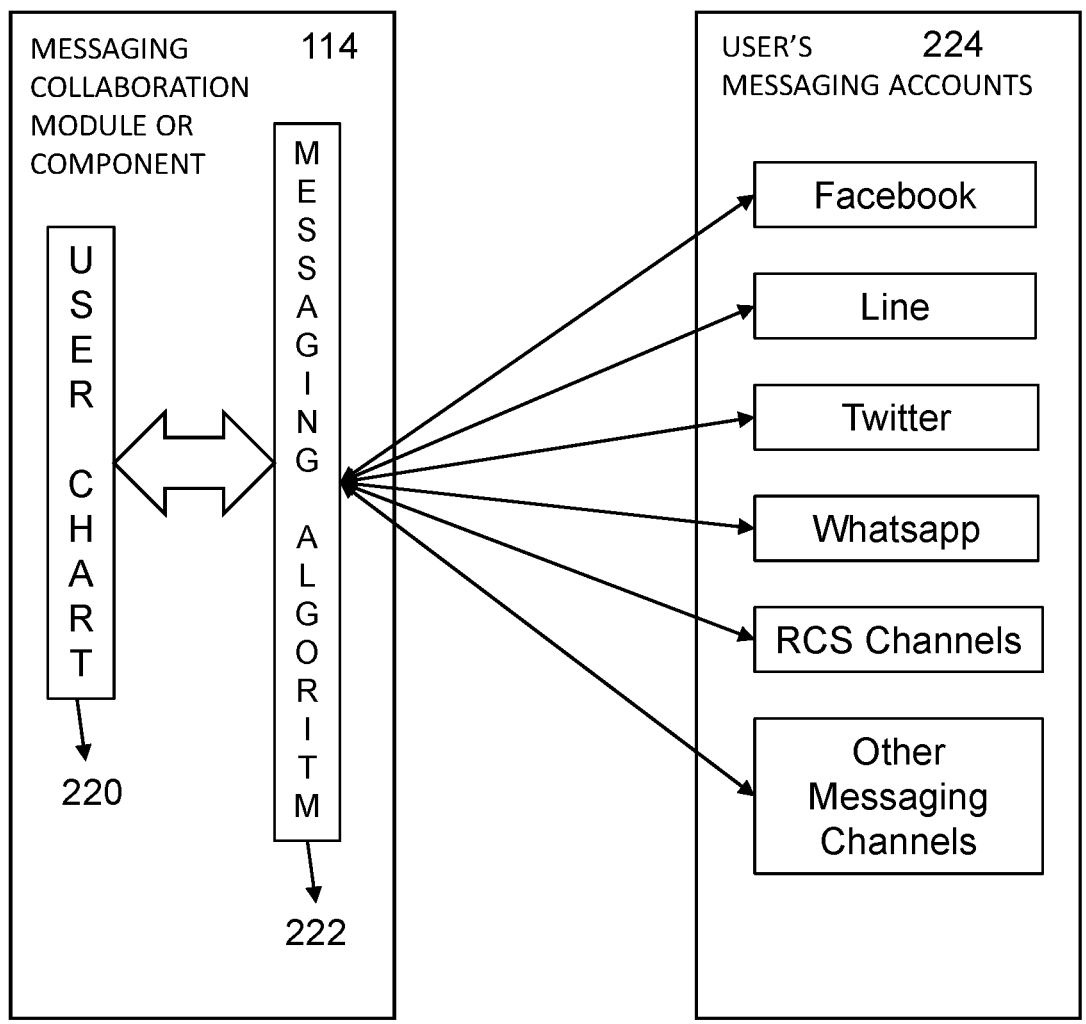

The Messaging Collaboration component 114 is described in more detail with regard to FIG. 2. Using available API's and/or SDK's, the Messaging Collaboration component 114 can monitor different messaging accounts of a user. For example, the user can initially identify different user accounts, authorizations and permissions to the Messaging Collaboration component 114. This identification of messaging accounts can also, in some embodiments, include different times or days in which the user is likely to be using a particular messaging channel or social media account. As such, the Messaging Collaboration component 114 can include intelligence to filter out different accounts based on the provided information when determining when and how to deliver a transcribed message.

In general, though, the Messaging Collaboration component 114 can implement an algorithm 222 to create a current chart 220 that is indicative of the user's activity on different messaging channels. The algorithm 222 can monitor the user's current activity levels on the various messaging channels 224 and develop a chart that ranks the messaging channels 224 based on which channel the user is apparently more active on at a present time. Thus, the chart 220 can be based on user preferences provided about what messaging channels they participate in and also be based on current user presence information on one or more of those identified channels.

When a voice message is received by the voicemail server 110 and transcribed by the ASR engine 112, that transcribed message can be delivered to one or more of the messaging channels 224 based on the ranked chart 220 of the Messaging Collaboration component 114. As mentioned above, additional filters could be applied by the algorithm 222 to avoid delivering messages at certain predetermined times as specified by the user. Additionally, the filters can specify rules based on the originator, or calling party. As such, a transcribed message from specified calling parties can be delivered or blocked during certain time periods based on the filters developed from the user's specified preferences.

Figure 3:
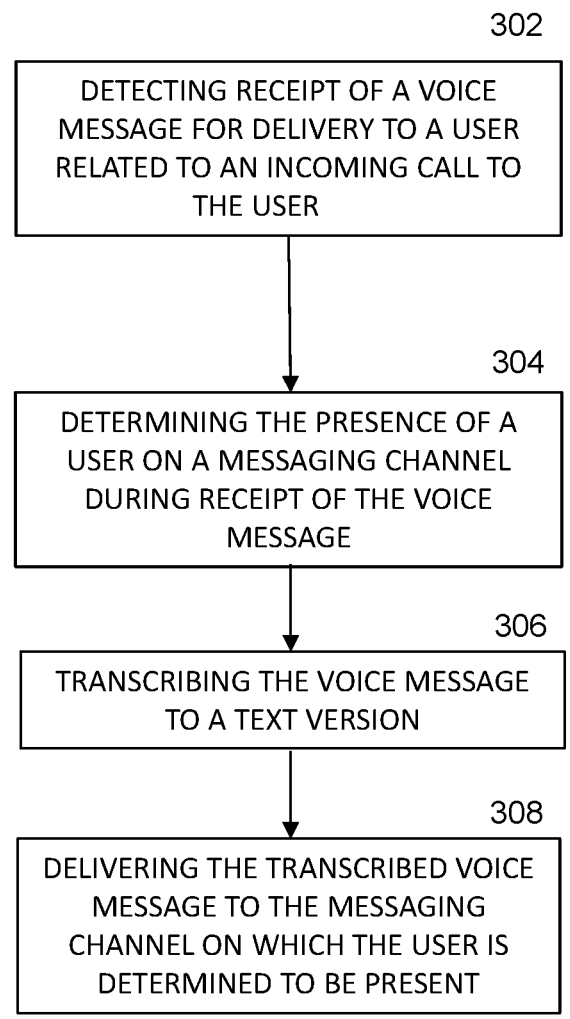
FIG. 3 illustrates one example implementation using a transcription service and delivery system in accordance with the principles of the present disclosure.

FIG. 3 illustrates an exemplary flow that can be implemented to perform embodiments of the present invention. The algorithm of FIG. 3 depicts a method for delivering a transcribed voice message in accordance with the principles of the present invention. The method includes, in step 302, detecting, by a computer, receipt of a voice message for delivery to a user, the voice message related to an incoming call for the user. As an example, a call can be received by a PBX that connects to a voicemail server. In step 304, the method continues with determining, by the computer, a current presence of the user on at least one of a plurality of messaging channels during receipt of the voice message; and in step 306, the computer transcribes the voice message to text.

Ultimately, the method concludes in step 308 with delivering, by the computer, the transcribed voice message to the at least one messaging channel on which the current presence of the user is determined. As mentioned above, the presence of the user on a messaging channel can be explicitly provided by a user for a particular time or day but alternatively can be programmatically determined by the Messaging Collaboration component based on the messaging algorithm 222. This programmatic determination can be based on monitoring the user's activities on different accounts and determining in which messaging channels the user appears to be most active. The number of postings, the response time between messages, and similar activity levels can be used to determine which messaging channel to deliver a transcribed voice message to. In a simpler approach, the API that would return the status of the user as to being one of: currently active or currently inactive. A binary status indicator such as this can be used since that requires minimal authorization/permissions from the user. More than one messaging channel can be selected such that the transcribed message is delivered to multiple channels simultaneously thereby increasing the likelihood that the message is received in near real time.

Furthermore, as discussed above, the ASR engine 112 can transcribe the message in real time as it is being received so that the transcribed message can be sent to the user during reception by the voicemail server 110. This allows the user to choose to access the call (via the voicemail server 110) during the call and not waiting until after the voicemail message is entirely received and transcribed.

Figure 4:
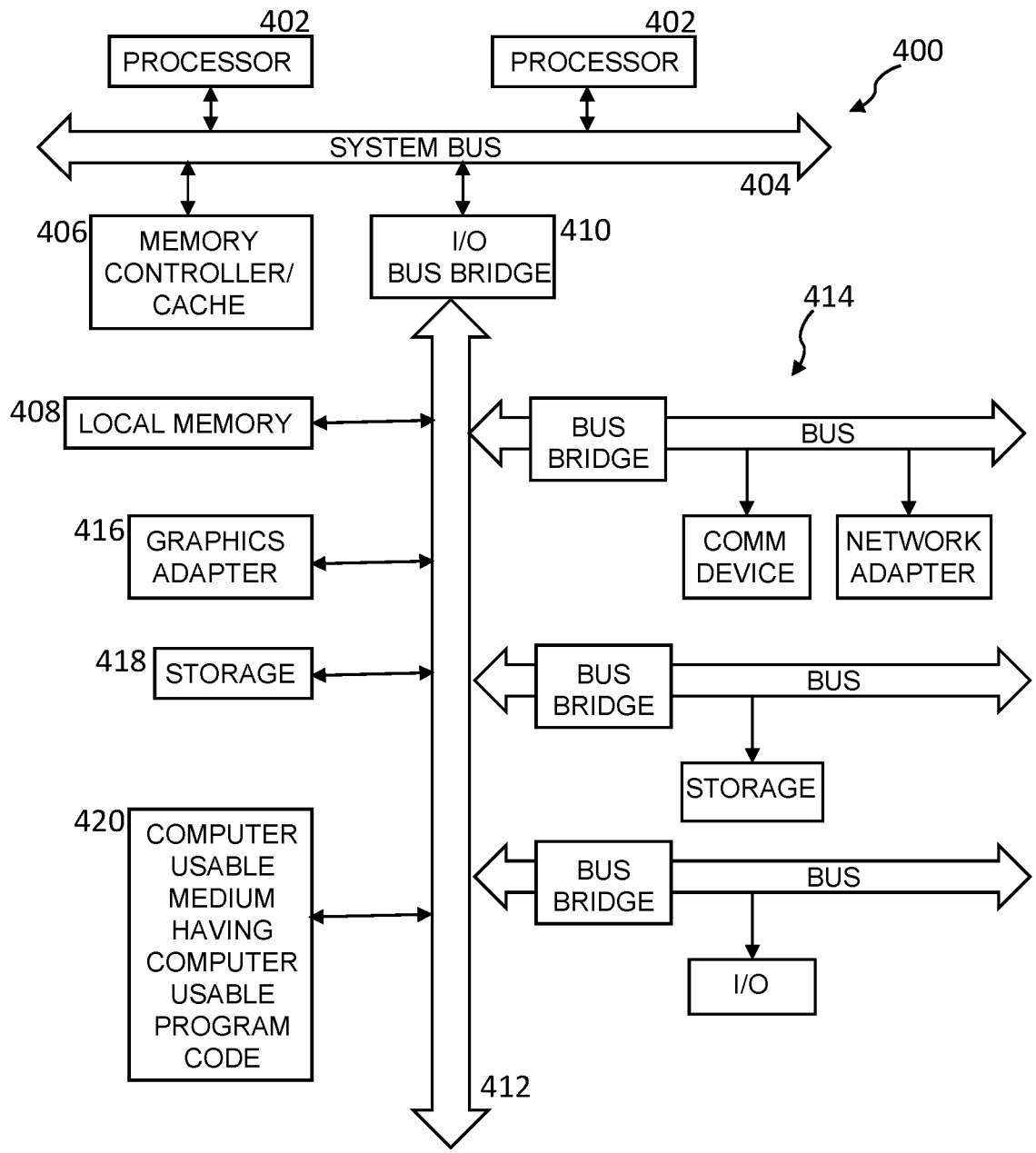
FIG. 4 is a block diagram of a data processing system in accordance with the principles of the present disclosure.

FIG. 4 is a block diagram of a data processing system in accordance with the principles of the present disclosure. Both the PBX 108 as well as the Voicemail Server 110 can be implemented on the example data processing system of FIG. 4. Similarly, the ASR Engine 112 and the Messaging Collaboration Module 114 can be implemented so as to execute on a data processing system as depicted in FIG. 4.

Referring to FIG. 4, a block diagram of a data processing system is depicted in accordance with the present disclosure. A data processing system 400, such as may be utilized to implement the systems, modules and algorithms or aspects thereof, e.g., as set out in greater detail in FIG. 1-FIG. 3, may comprise a symmetric multiprocessor (SMP) system or other configuration including a plurality of processors 402 connected to a system bus 404. Alternatively, a single processor 402 may be employed. Also connected to the system bus 404 is a memory controller/cache 406, which provides an interface to local memory 408. An I/O bridge 410 is connected to the system bus 404 and provides an interface to an I/O bus 412. The I/O bus may be utilized to support one or more buses and corresponding devices 414, such as bus bridges, input/output devices (I/O devices), storage, network adapters, etc. Network adapters may also be coupled to the system to enable the data processing system to become coupled to other data processing systems or remote printers or storage devices through intervening private or public networks.

Also connected to the I/O bus may be devices such as a graphics adapter 416, storage 418 and a computer usable storage medium 420 having computer usable program code embodied thereon. The computer usable program code may be executed to execute any aspect of the present disclosure, for example, to implement an aspect of any of the methods, computer program products and/or system components illustrated in FIG. 1-FIG. 3.

The flowchart and block diagrams in the figures illustrate the architecture, functionality, and operation of possible implementations of systems, methods and computer program products according to various aspects of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

As will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "circuit," "module," "component," or "system." Furthermore, aspects of the present disclosure may take the form of a computer program product embodied in one or more computer-readable media having computer readable program code embodied thereon.

Any combination of one or more computer-readable media may be utilized. The computer-readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that may contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that may communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as JAVA, SCALA, SMALLTALK, EIFFEL, JADE, EMERALD, C++, CII, VB.NET, PYTHON or the like, conventional procedural programming languages, such as the "c" programming language, VISUAL BASIC, FORTRAN 2003, PERL, COBOL 2002, PHP, ABAP, dynamic programming languages such as PYTHON, RUBY, and GROOVY, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or WAN, or the connection may be made to an external computer (for example, through the Internet using an Internet Service Provider) or in a cloud computing environment or offered as a service such as a Software as a Service (SaaS).

Aspects of the present disclosure are described herein with reference to flowchart illustrations and/or block diagrams of methods, apparatuses (systems) and computer program products according to embodiments of the present disclosure. It will be understood that each block of the flowchart illustrations and/or block diagrams, and combinations of blocks in the flowchart illustrations and/or block diagrams, may be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks. Alternatively, a symmetric multiprocessor (SMP) system or other configuration including a plurality of processors may be used.

These computer program instructions may also be stored in a computer readable medium that when executed may direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions that execute on the computer or other programmable apparatus provide processes for implementing the functions/acts specified in the flowchart and/or block diagram block or blocks.

While the exemplary embodiments illustrated herein show the various components of the system collocated, certain components of the system may be located remotely, at distant portions of a distributed network, such as a LAN and/or the Internet, or within a dedicated system. Thus, it should be appreciated, that the components of the system may be combined into one or more devices, such as a switch, server, and/or adjunct, or collocated on a particular node of a distributed network, such as an analog and/or digital telecommunications network, a packet-switch network, or a circuit-switched network. It will be appreciated from the preceding description, and for reasons of computational efficiency, that the components of the system may be arranged at any location within a distributed network of components without affecting the operation of the system. For example, the various components may be located in a switch such as a PBX and media server, gateway, in one or more communications devices, at one or more users' premises, or some combination thereof. Similarly, one or more functional portions of the system could be distributed between a telecommunications device(s) and an associated computing device.

Furthermore, it should be appreciated that the various links connecting the elements may be wired or wireless links, or any combination thereof, or any other known or later developed element(s) that is capable of supplying and/or communicating data to and from the connected elements. These wired or wireless links may also be secure links and may be capable of communicating encrypted information. Transmission media used as links, for example, may be any suitable carrier for electrical signals, including coaxial cables, copper wire, and fiber optics, and may take the form of acoustic or light waves, such as those generated during radio-wave and infra-red data communications.

A number of variations and modifications of the disclosure may be used. It would be possible to provide for some features of the disclosure without providing others. For example, in one alternative embodiment, the systems and methods of this disclosure may be implemented in conjunction with a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device or gate array such as PLD, PLA, FPGA, PAL, special purpose computer, any comparable means, or the like. In general, any device(s) or means capable of implementing the methodology illustrated herein may be used to implement the various aspects of this disclosure. Exemplary hardware that may be used for the present disclosure includes computers, handheld devices, telephones (e.g., cellular, Internet enabled, digital, analog, hybrids, and others), and other hardware known in the art. Some of these devices include processors (e.g., a single or multiple microprocessors), memory, nonvolatile storage, input devices, and output devices. Furthermore, alternative software implementations including, but not limited to, distributed processing or component/object distributed processing, parallel processing, or virtual machine processing may also be constructed to implement the methods described herein.

Although the present disclosure describes components and functions implemented in the embodiments with reference to particular standards and protocols, the disclosure is not limited to such standards and protocols. Other similar standards and protocols not mentioned herein are in existence and are considered to be included in the present disclosure. Moreover, the standards and protocols mentioned herein and other similar standards and protocols not mentioned herein are periodically superseded by faster or more effective equivalents having essentially the same functions. Such replacement standards and protocols having the same functions are considered equivalents included in the present disclosure.

While the foregoing is directed to embodiments of the present disclosure, other and further embodiments of the present disclosure may be devised without departing from the basic scope thereof. It is understood that various embodiments described herein may be utilized in combination with any other embodiment described, without departing from the scope contained herein. Further, the foregoing description is not intended to be exhaustive or to limit the present disclosure to the precise form disclosed. Modifications and variations are possible in light of the above teachings or may be acquired from practice of the present disclosure.

What is claimed is:

1. A method for delivering a transcribed voice message comprising:
    detecting, by a computer, receipt of a voice message for delivery to a user, the voice message related to an incoming call for the user;
    receiving and analyzing, by the computer, an indication of messaging channel preference from the user for a plurality of messaging channels;
    determining, by the computer, a ranked list of at least a portion of the plurality of messaging channels based on the indication of messaging channel preference;
    selecting, by the computer, at least one messaging channel to deliver the transcribed voice message from the ranked list;
    transcribing, by the computer, the voice message to text;
    delivering, by the computer, the transcribed voice message to the at least one messaging channel selected from the ranked list;
    receiving, by the computer, an instruction from the user to connect with the incoming call while the voice message is being transcribed and delivered to the at least one messaging channel; and
    connecting, by the computer, the user with the incoming call while the voice message is being transcribed and delivered to the at least one messaging channel.

2. The method of claim 1, wherein the indication of messaging channel preference includes one or more messaging channels associated with different time periods.

3. The method of claim 2, wherein the different time periods include at least one different time period within a single day, or different days within a week, or different weeks within a month.

4. The method of claim 1, wherein transcribing the voice message occurs in real-time as the voice message is being received.

5. The method of claim 1, wherein the transcribed voice message is delivered in real-time to the at least one messaging channel as the voice message is being received.

6. The method of claim 1, further comprising:
    continuously monitoring, by the computer, the plurality of messaging channels to determine whether the user is present on each channel.

7. The method of claim 1, further comprising:
    continuously monitoring, by the computer, a subset of the plurality of messaging channels to determine whether the user is present on each channel, wherein the subset is selected based on the indication of messaging channel preference received from the user.

8. A system for delivering a transcribed voice message comprising:
    a memory device, storing executable instructions; and
    a processor in communication with the memory device, the processor when executing the executable instructions:
        detects receipt of a voice message for delivery to a user, the voice message related to an incoming call for the user;
        receives and analyzes an indication of messaging channel preference from the user for a plurality of messaging channels;
        determines a ranked list of at least a portion of the plurality of messaging channels based on the indication of messaging channel preference;
        selects at least one messaging channel to deliver the transcribed voice message from the ranked list;
        transcribes the voice message to text;
        delivers the transcribed voice message to the at least one messaging channel selected from the ranked list;
        receives an instruction from the user to connect with the incoming call while the voice message is being transcribed and delivered to the at least one messaging channel; and
        connects the user with the incoming call while the voice message is being transcribed and delivered to the at least one messaging channel.

9. The system of claim 8, wherein the indication of messaging channel preference includes one or more messaging channels associated with different time periods.

10. The system of claim 9, wherein the different time periods include at least one different time period within a single day, or different days within a week, or different weeks within a month.

11. The system of claim 8, wherein transcribing the voice message occurs in real-time as the voice message is being received.

12. The system of claim 8, wherein the transcribed voice message is delivered in real-time to the at least one messaging channel as the voice message is being received.

13. The system of claim 8, wherein the processor when executing the executable instructions:
    continuously monitors the plurality of messaging channels to determine whether the user is present on each channel.

14. The system of claim 1, wherein the processor when executing the executable instructions:
    continuously monitors a subset of the plurality of messaging channels to determine whether the user is present on each channel, wherein the subset is selected based on the indication of messaging channel preference received from the user.

15. A method for delivering a transcribed voice message comprising:
    detecting, by a computer, receipt of a voice message for delivery to a user, the voice message related to an incoming call for the user;

determining, by the computer, a current presence of the user on at least one of a plurality of messaging channels during receipt of the voice message;

receiving, by the computer, the transcribed voice message;

receiving, by the computer, an indication of messaging channel preference from the user, wherein the indication of messaging channel preference includes one or more messaging channels associated with different time periods;

analyzing, by the computer, the indication of messaging channel preference from the user;

determining, by the computer, a ranked list of at least a portion of the plurality of messaging channels based on the indication of messaging channel preference;

selecting, by the computer, the at least one messaging channel to deliver the transcribed voice message from the ranked list; and delivering, by the computer, the transcribed voice message to the at least one messaging channel on which the current presence of the user is determined.

16. A system for delivering a transcribed voice message comprising:

a memory device, storing executable instructions; and a processor in communication with the memory device, the processor when executing the executable instructions:

detects receipt of a voice message for delivery to a user, the voice message related to an incoming call for the user;

determines a current presence of the user on at least one of a plurality of messaging channels during receipt of the voice message;

receives the transcribed voice message;

receives an indication of messaging channel preference from the user, wherein the indication of messaging channel preference includes one or more messaging channels associated with different time periods;

analyzes the indication of messaging channel preference from the user;

determines a ranked list of at least a portion of the plurality of messaging channels based on the indication of messaging channel preference;

selects the at least one messaging channel to deliver the transcribed voice message from the ranked list; and delivers the transcribed voice message to the at least one messaging channel on which the current presence of the user is determined.

* * * * *